(12) United States Patent
Chun et al.

(10) Patent No.: US 10,310,353 B2
(45) Date of Patent: Jun. 4, 2019

(54) ALIGNED PARTICLE LAYER

(71) Applicant: Hewlett-Packard Development Company, L.P., Fort Collins, CO (US)

(72) Inventors: Doris Chun, Palo Alto, CA (US);
Napoleon J Leoni, Palo Alto, CA (US);
Henryk Birecki, Palo Alto, CA (US);
Omer Gila, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 20 days.

(21) Appl. No.: 15/306,709

(22) PCT Filed: Apr. 25, 2014

(86) PCT No.: PCT/US2014/035421
§ 371 (c)(1),
(2) Date: Oct. 25, 2016

(87) PCT Pub. No.: WO2015/163907
PCT Pub. Date: Oct. 29, 2015

(65) Prior Publication Data
US 2017/0052421 A1 Feb. 23, 2017

(51) Int. Cl.
*G02F 1/167* (2006.01)
*H01B 1/00* (2006.01)
*G02F 1/1675* (2019.01)

(52) U.S. Cl.
CPC .............. *G02F 1/167* (2013.01); *H01B 1/00* (2013.01); *G02F 2001/1678* (2013.01)

(58) Field of Classification Search
CPC .. G02F 1/167; G02F 2001/01678; H01B 1/00
See application file for complete search history.

(56) References Cited

U.S. PATENT DOCUMENTS

| | | | |
|---|---|---|---|
| 5,866,284 A | 2/1999 | Vincent | |
| 6,333,754 B1 | 12/2001 | Oba et al. | |
| 6,407,763 B1* | 6/2002 | Yamaguchi | G02F 1/167 345/107 |
| 6,426,552 B1 | 7/2002 | Reeder | |
| 6,515,790 B2 | 2/2003 | Miyamoto et al. | |
| 6,632,532 B1 | 10/2003 | Yamada | |
| 6,982,734 B2 | 1/2006 | Pan et al. | |

(Continued)

FOREIGN PATENT DOCUMENTS

| | | |
|---|---|---|
| CN | 1469177 | 1/2004 |
| CN | 103050170 | 4/2013 |

(Continued)

OTHER PUBLICATIONS

Dexerials, Anisotropic Conductive Film (ACF) for Film on Glass for Touch panel, Feb. 12, 2013, 2 pages.

(Continued)

*Primary Examiner* — Joseph P Martinez
*Assistant Examiner* — Vipin Patel
(74) *Attorney, Agent, or Firm* — Dicke Billig & Czaja PLLC

(57) ABSTRACT

A charge-receiving layer for an e-paper assembly includes a plurality of conductive paths spaced apart throughout an insulative matrix, with each conductive path including at least one elongate pattern of conductive particles.

19 Claims, 11 Drawing Sheets

(56) References Cited

U.S. PATENT DOCUMENTS

| | | |
|---|---|---|
| 7,140,550 B2 | 11/2006 | Ramachandran |
| 7,580,845 B2 | 8/2009 | Burman et al. |
| 7,663,582 B2 * | 2/2010 | Schmitz ............... G02B 26/026 |
| | | 345/107 |
| 7,785,494 B2 | 8/2010 | Yeh |
| 7,855,711 B2 | 12/2010 | Schmitz |
| 8,018,410 B2 | 9/2011 | Schmitz |
| 8,144,388 B2 | 3/2012 | Ogawa |
| 8,514,256 B2 | 8/2013 | Ogawa et al. |
| 2003/0067427 A1 | 4/2003 | Comiskey et al. |
| 2004/0252360 A1 * | 12/2004 | Webber ............. G02F 1/133305 |
| | | 359/296 |
| 2005/0134550 A1 | 6/2005 | Schmitz |
| 2006/0017659 A1 | 1/2006 | Ogawa et al. |
| 2006/0263581 A1 | 11/2006 | Park |
| 2007/0035808 A1 | 2/2007 | Amundson et al. |
| 2007/0045399 A1 | 3/2007 | Martin |
| 2008/0174531 A1 | 7/2008 | Sah |
| 2008/0297878 A1 | 12/2008 | Brown |
| 2009/0294046 A1 | 12/2009 | Sim |
| 2010/0101700 A1 | 4/2010 | Liang |
| 2011/0298760 A1 | 12/2011 | Gila et al. |
| 2012/0168218 A1 | 7/2012 | Tomita |
| 2012/0206341 A1 | 8/2012 | Gila et al. |
| 2012/0249711 A1 | 10/2012 | Tamoto |
| 2012/0274616 A1 | 11/2012 | Scribner |
| 2012/0320001 A1 | 12/2012 | Gila et al. |
| 2013/0003162 A1 | 1/2013 | Leoni et al. |
| 2013/0235446 A1 | 9/2013 | Leoni et al. |
| 2013/0264019 A1 | 10/2013 | Helgesen et al. |
| 2013/0320467 A1 | 12/2013 | Buchanan |
| 2014/0210805 A1 | 7/2014 | Birecki et al. |
| 2014/0239068 A1 | 8/2014 | Park |
| 2014/0253426 A1 | 9/2014 | Leoni et al. |

FOREIGN PATENT DOCUMENTS

| | | |
|---|---|---|
| CN | 103424946 | 12/2013 |
| JP | 2000149665 | 5/2000 |
| KR | 102012005133 | 5/2012 |
| KR | 102013000653 | 1/2013 |

OTHER PUBLICATIONS

Anisotropic Conductive Film(ACF) for film on glass for touch panel.

* cited by examiner

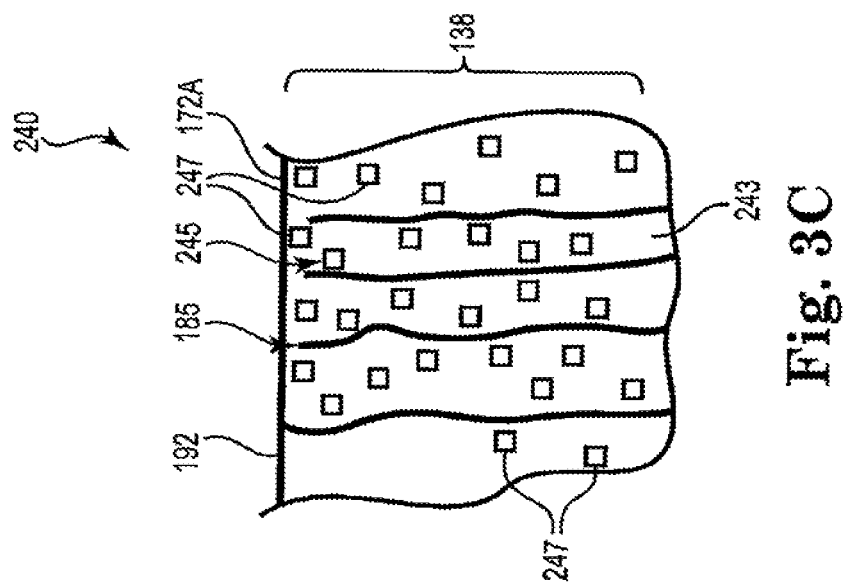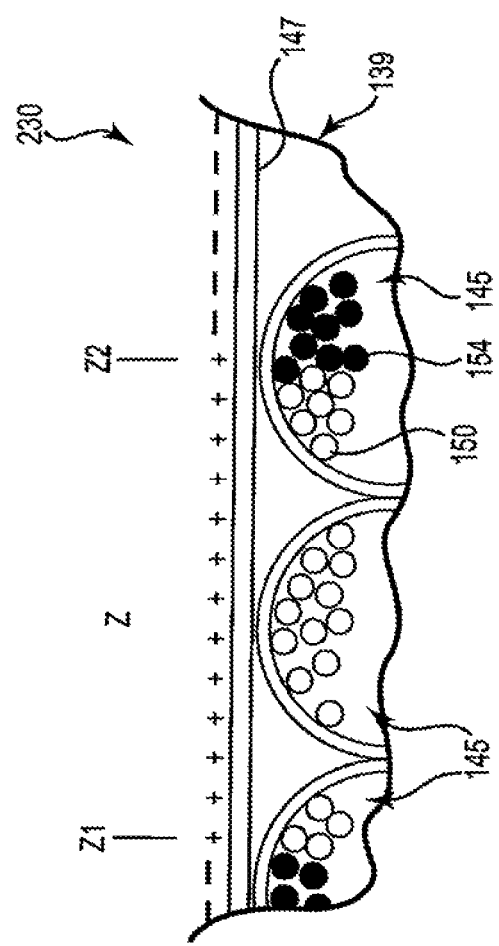

ALIGNED PARTICLE LAYER

BACKGROUND

Electronic paper ("e-paper") is a display technology designed to recreate the appearance of ink on ordinary paper. Some examples of e-paper reflect light like ordinary paper and may be capable of displaying text and images. Some e-paper is implemented as a flexible, thin sheet, like paper. One familiar e-paper implementation includes e-readers.

BRIEF DESCRIPTION OF THE DRAWINGS

FIG. 3B is an enlarged sectional view of a portion of FIG. 3A that schematically represents a portion of an e-paper assembly, according to an example of the present disclosure.

FIG. 3C is an enlarged sectional view schematically representing a portion of an e-paper assembly, according to an example of the present disclosure.

DETAILED DESCRIPTION

Figure 1A:
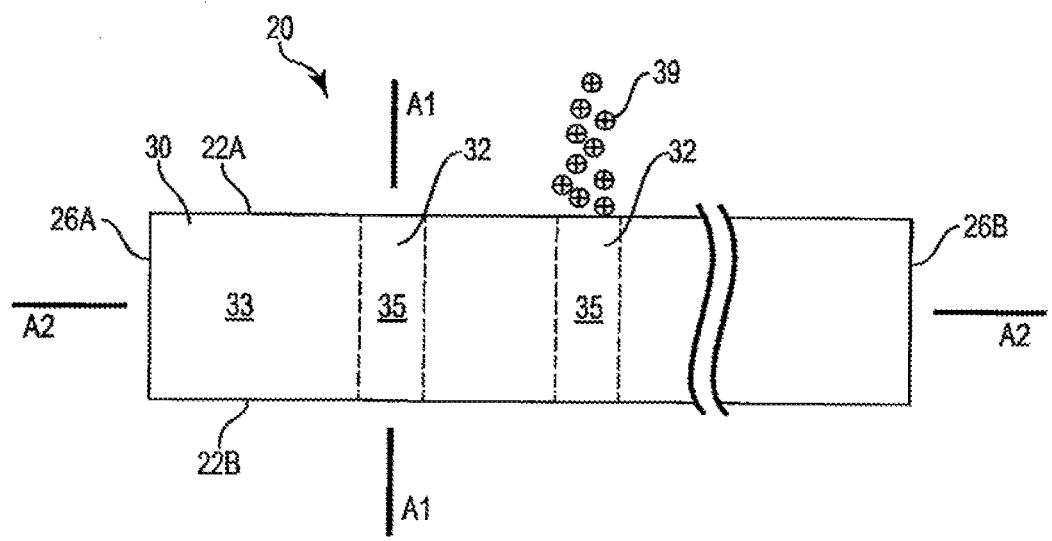
FIG. 1A is a sectional view schematically representing a charge-receiving layer, according to an example of the present disclosure.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense.

At least some examples of the present disclosure are directed to a coating layer that protects an e-paper structure while also acting as a charge-receiving layer to receive airborne charges from a non-contact, external image-writing module and facilitate passage of those charges to a charge-responsive layer of the e-paper structure. In one aspect, the coating layer exhibits anisotropic conductivity to facilitate passage of the airborne charges in a first orientation through a thickness of the coating layer while inhibiting migration of those charges in a second orientation generally perpendicular to first orientation. In one aspect, the second orientation is generally parallel to a plane through which the coating layer extends. The coating layer also has a thickness and/or composition that provides scratch resistance, strength, and toughness to protect the e-paper structure from mechanical insults. In some examples, other aspects of the coating layer provide protection from electrical insults, as further described later.

In some examples, a charge-receiving layer for an electronic paper assembly includes a plurality of conductive paths spaced apart throughout an electrically insulative matrix (e.g. a conductive-resistant medium). Each conductive path includes at least one elongate pattern of separate conductive particles. In one aspect, each conductive path extends in a first orientation generally perpendicular to a plane through which the charge-receiving layer extends and a plane through which the charge-responsive layer extends. In some examples, the conductivity of any single elongate pattern of conductive particles is at least two orders of magnitude greater than a conductivity of the insulative matrix. In some examples, a combined conductivity of all the conductive paths is about one order of magnitude greater than a conductivity of the insulative matrix.

It will be understood that the term "insulative matrix" does not indicate that the matrix is an absolute electrical insulator, but rather that the matrix is electrically insulative at least relative to the conductivity of the conductive paths (of elongate patterns of conductive particles). Further examples of the insulative matrix are described throughout the present disclosure.

With such arrangements provided via at least some example of the present disclosure, charges deposited on a surface of the charge-receiving layer can travel in generally direct alignment with a targeted area of the charge-responsive layer (of an e-paper structure) to be imaged.

In sharp contrast, unprotected e-paper will not survive the rigors of use in practical consumer and business applications. In further sharp contrast to at least some examples of the present disclosure, other types of protective coatings which exhibit nearly perfect dielectric behavior (e.g. glass, some polymers) tend to produce "dot blooming" because any charges deposited on the surface of the protective layer tend to build up at the surface of the protective coating and spread laterally far beyond the targeted area. This surface spreading, in turn, results in lateral spreading of the imaged area in the charge-responsive layer of the e-paper structure, thereby reducing the clarity and resolution of the image.

In further sharp contrast to at least some examples of the present disclosure, other types of protective coatings exhibit semi-conductive behaviors and therefore permit passage of charges through a thickness of the protective coating to a charge-responsive layer. However, the isotropic nature of the semi-conductive protective coatings still results in a "dot blooming" effect because as the charges travel through the semi-conductive material, the charges spread laterally so that by the time the charges reach the targeted image area, the charges affect an much larger than intended area of the charge-responsive layer. This behavior can result in poor image quality.

However, with at least some examples of the present disclosure, some of which are introduced above, even with relatively thick protective coatings (e.g. 150 μm), an anisotropic conductive configuration in the charge-receiving layer prevents lateral migration of deposited charges. Accordingly, high quality imaging is achieved while providing the desired protection for the e-paper structures.

In at least some examples of the present disclosure, a method of manufacturing an outer coating for an e-paper structure includes forming a first layer from a mixture of conductive particles dispersed within an insulative matrix. A field is applied to cause the conductive particles to align in generally parallel, spaced apart elongate patterns that are generally perpendicular to a plane through which the layer extends. In some examples, the applied field is a magnetic field and the particles are magnetically-responsive particles. In some examples, the applied field is an electric field.

In some examples, the method further includes curing, at ambient temperatures and without applied pressure, the first layer via radiation energy while maintaining the applied field.

In one aspect, at least an outer surface of the protective outer coating (for the e-paper structure) that is exposed to the ambient environment is non-adhesive or non-sticky.

In sharp contrast to at least some examples of the present disclosure, at least some types of anisotropic conductive films (ACF) act as adhesive interconnects for circuitry components and therefore do not serve well as outer protective coatings generally, and particularly for a charge-responsive layer of an e-paper structure. Moreover, deployment of such types of anisotropic conductive films (ACF) typically involves the application of high heat and/or pressure, which would be destructive to the delicate nature of passive e-paper structures.

In addition, such types of anisotropic conductive films typically rely on a monolayer of metal spheres which define the thickness of the film. Accordingly, attempts to create relatively thick protective films (e.g. 150 μm) would involve films with large diameter spheres, and typically result in large spacing (e.g. 150 μm) between the conductive spheres. This arrangement, in turn, would result in a poor mismatch between the large spaces between adjacent conductive spheres relative to the closely adjacent microcapsules of the passive e-paper structure, leading to poor image quality. In another aspect, traditional anisotropic conductive films typically used as circuitry interconnects also exhibit impedances on the order of Ohms.

In sharp contrast, in at least some examples of the present disclosure the insulative matrix exhibit impedances in hundreds of kiloOhms (e.g. $10^5$ to $10^9$ Ohms) while each preferential conductive path exhibits impedances about two orders of magnitude less than the insulative matrix. In this environment, in at least some examples of the present disclosure, a current density associated with deposited airborne charges and the above-described preferential conductive charge-receiving layer falls within a range of 10 to 100 μA/cm².

In at least some further examples of the present disclosure, the conductive particles have a maximum dimension no greater than 5 μm. In some examples, the generally parallel elongate patterns (of conductive particles) are spaced apart from each other by about 10 μm. In some examples, the conductive particles have a maximum dimension no greater than 100 nanometers. In some examples, the conductive particles have a maximum dimension no greater than 10 nanometers. Other examples are described later.

In some examples, the conductive particles are sized such that each elongate pattern of aligned particles comprises a mono-layer in which a width of a respective elongate pattern corresponds to a maximum dimension of a respective one of the conductive particles. In some examples, the conductive particles have a relatively smaller size such that each elongate pattern of aligned particles comprises a multi-layer in which a width of each elongate pattern corresponds to multiple layers of the conductive particles.

Moreover, an e-paper structure (according to at least some examples of the present disclosure) forms at least a portion of a passive e-paper display media. The passive e-paper display media is relatively thin and light because it omits a power supply and omits internal circuitry, thereby giving the passive e-paper display media a look and feel more like traditional paper. The passive e-paper display media in at least some examples of the present disclosure relies on a charge-responsive layer that is imageable via an external writing module and that does not require a power supply to be imaged or to retain an image.

In sharp contrast, traditional e-paper implementations include active e-paper structures having internal circuitry and/or an on-board power supply, making them relatively heavy and not feeling like traditional paper.

These examples, and additional examples, are described and illustrated below in association with at least FIGS. 1A-10.

FIG. 1A is a side sectional view schematically representing a coating layer 20, according to an example of the present disclosure. In one example, the coating layer 20 provides protection for an e-paper structure (shown later in at least FIGS. 3A, 5-8).

As shown in FIG. 1A, coating layer 20 includes a first side 22A and an opposite second side 22B, as well as opposite ends 26A, 26B. In one example, coating layer 20 includes a body 30 in which is formed a plurality of conductive pathways 32. In one aspect a longitudinal axis (A1) of the conductive paths 32 extends generally perpendicular to a longitudinal axis (A2) the body 30. In one example, in contrast to conductive paths 32, body 30 includes an insulative matrix 33 (e.g. conductive-resistant medium).

In one example, the conductivity ($\sigma_{path}$) of a single conductive path 32 is at least two orders of magnitude greater than the conductivity ($\sigma_{body}$) of body 30. In some examples, a combined conductivity of all the conductive paths 32 in coating layer 20 is at least one order of magnitude greater than the conductivity ($\sigma_{body}$) of body 30.

As further shown in FIG. 1A, coating layer 20 is adapted to receive air-borne charges 39 from an external imaging head (not shown) that is spaced apart from and not in contact with the coating layer 20. In one aspect, due to the relatively low conductivity of body 30, charges that are generally received on body 30 are conducted laterally through the outer surface of body 30 until they reach a conductive pathway 35 while charges received at a conductive pathway 35 travel straight (i.e. directly) through a thickness of the coating layer 20. In particular, the relatively high conductivity of conductive paths 32 facilitates passage of the charges (through layer 20) from the first side 22A to the second side 22B.

In some examples, when coating layer 20 forms part of a larger e-paper assembly, coating layer 20 acts as a charge-receiving layer to facilitate receiving charges from an external location/source and conveying those charges to a charge-responsive layer of the e-paper assembly. This configuration is illustrated later in association with at least FIGS. 3A and 5-8.

In one example, for illustrative purposes, FIG. 1A does not depict a particular density of conductive paths 32 relative to body 30. Rather, the coating layer 20 in FIG. 1A is merely illustrative for describing general principles in at least some examples of the present disclosure, such as the orientation and/or conductivity of the paths 32 relative to body 30.

Figure 1B:
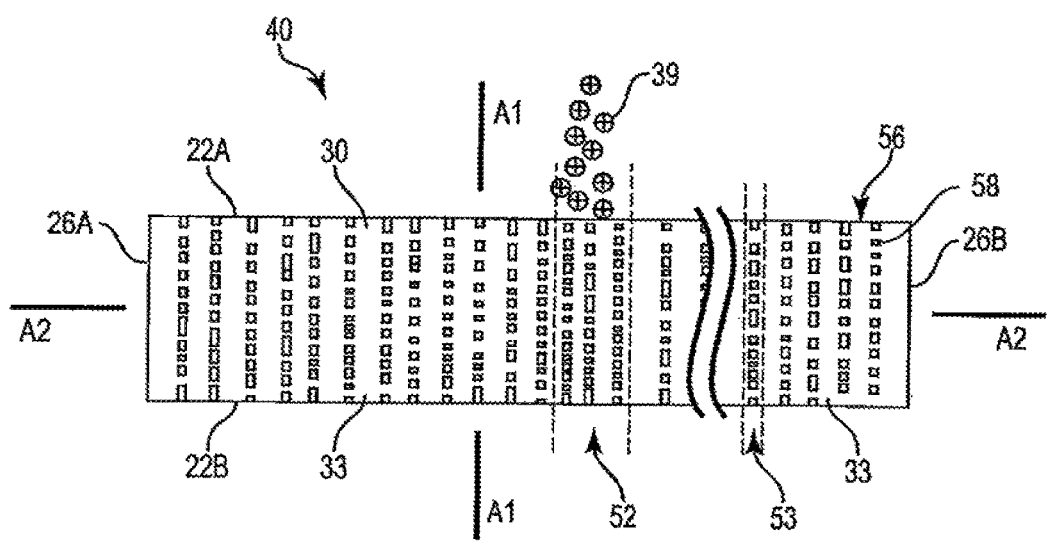
FIG. 1B is a sectional view schematically representing a charge-receiving layer, according to an example of the present disclosure.

FIG. 1B is a side sectional view of a coating layer 40, according to one example of the present disclosure. In some examples, coating layer 40 is at least consistent with, and/or includes at least some of substantially the same features and attributes as, coating layer 20 in FIG. 1A. In coating layer 40, a plurality of conductive paths extend from first side 22A to second side 22B with each conductive path being defined by at least one elongate pattern 56 of conductive particles 58. Each conductive path facilitates the passage of charges from first side 22A to second side 22B.

In some examples, as shown in FIG. 1B, a conductive path 53 corresponds to a single elongate pattern 56 of conductive particles 58 while in some examples, a conductive path 52 corresponds to at least two adjacent elongate patterns 56 of conductive particles 58.

In one example, the conductivity ($\sigma_{path}$) of a single elongate pattern 56 of conductive particles 58 is at least two orders of magnitude greater than the conductivity ($\sigma_{body}$) of body 30 of insulative matrix 33 at the relevant electrical fields used for imaging.

In some examples, the number of adjacent elongate patterns 56 of conductive particles 58 that defines a conductive path 52 corresponds to a size of an imageable dot in a dot-based imaging scheme. For instance, in one example implementation involving an image with 300 dots-per-inch density on a media, a dot is about 80 to 100 microns in diameter with the dots spaced apart by 84 microns. In such an implementation, as further described below in association with at least FIGS. 4A-4B, several elongate patterns 56 of conductive particles 58 define the conductive path 52 to cause imaging of a single dot on a charge-responsive layer of an e-paper assembly.

Figure 2A:
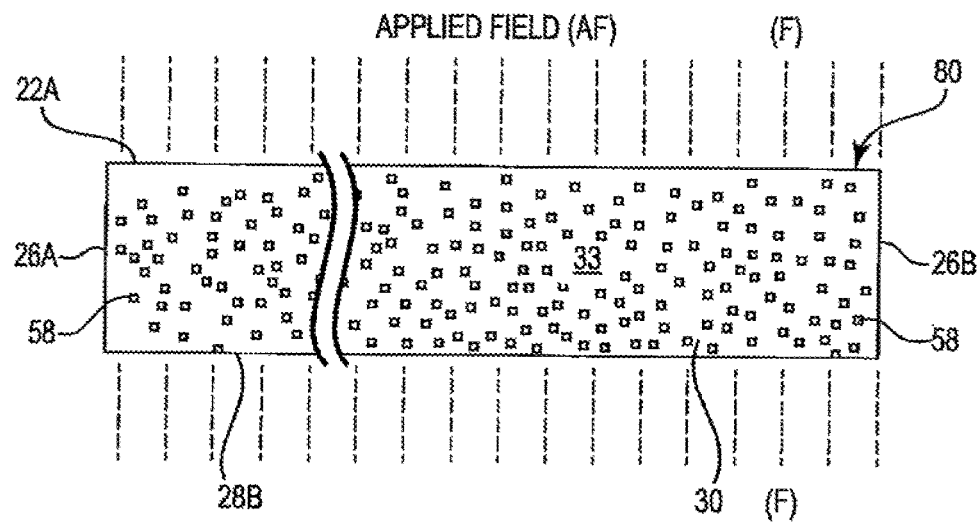
FIG. 2A is a sectional view schematically representing a charge receiving layer, according to an example of the present disclosure.

In one example, particles 58 are at least partially made of a field-responsive material that is alignable into the elongate patterns 56 during formation of the coating layer 40. With this in mind, FIG. 2A provides a brief introduction into the process of forming the elongate patterns 56 of separate conductive particles 58 within body 30. In particular, as shown in FIG. 2A, a fluid mixture of at least insulative matrix 33 (e.g. conductive-resistant medium) and conductive particles 58 is formed as a layer 80 on a substrate, such as but not limited to, an e-paper assembly. Upon initial deposit, the particles 58 within the layer 80 are randomly and generally dispersed throughout the insulative matrix 33. Prior to curing of the layer 80, a field (AF) is applied to the layer 80 with an orientation to cause the conductive particles 58 to become aligned with the field lines (F) of the applied field (AF), to result in the arrangement shown in FIG. 1B, in which the particles 58 remain separate particles but become aligned into elongate patterns 56 that are generally parallel to each other and spaced apart from each other, as shown in FIG. 1B. In some examples, once aligned into an elongate pattern 56, some particles 58 (of a particular elongate pattern 56) contact each other while some particles (of that same elongate pattern 56) are spaced apart from each other. Once in the arrangement shown in FIG. 1B, at least layer 80 is cured in a manner such that the particles 58 will remain in the arrangement shown in FIG. 1B.

In one example, the conductive particles 58 include a magnetically-responsive material and the applied field is a magnetic field.

Further details regarding the type of material comprising the particles and regarding a process of arranging the particles 58 into elongate patterns 56 are described later in association with at least FIGS. 9-10.

Figure 2B:
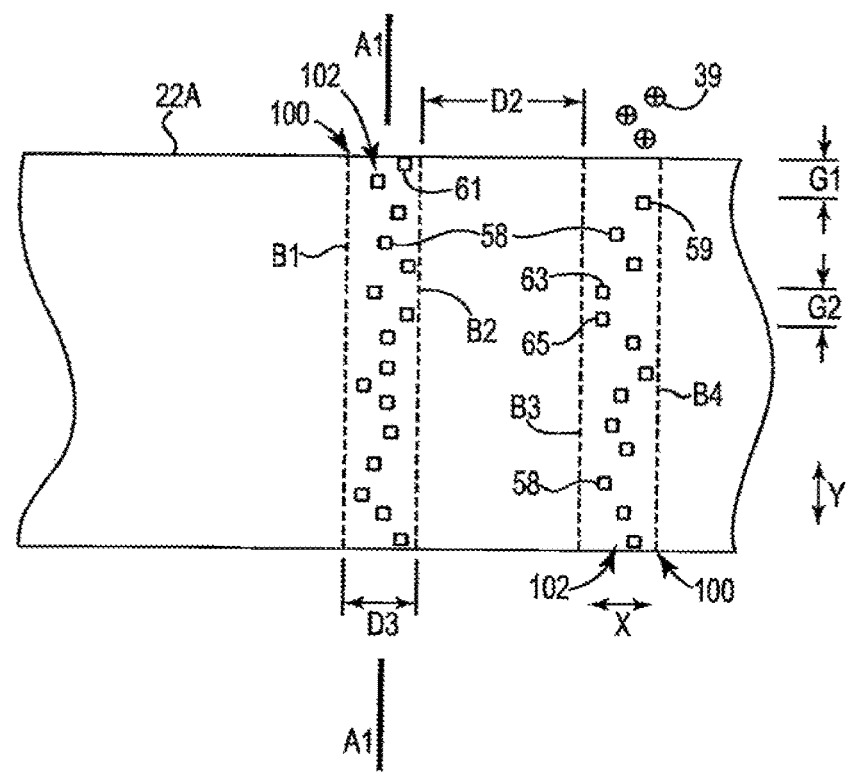
FIG. 2B is a sectional view schematically representing a charge-receiving layer, according to an example of the present disclosure.

FIG. 2B is a sectional view schematically representing a charge-receiving layer 90, according to one example of the present disclosure. In some examples, charge-receiving layer 90 is at least consistent with and/or includes at least substantially the same features and attributes as charge-receiving layer 40 (as previously described in association with FIG. 1B), except for providing elongate patterns 102 of conductive particles 58 (forming conductive paths 100) in which the conductive particles 58 are not aligned in a strictly linear pattern. Instead, the particles 58 vary in their position along the X plane (represented by directional arrow X) by a small distance, but with substantially all of the particles 58 (of one elongate pattern 102) falling between boundaries B1 and B2 (for one conductive path 100), and between B3 and B4 (for another conductive path 100), respectively. In addition, despite the variable spacing along the X plane, the conductive particles 58 still form elongate patterns 102 that have a longitudinal axis (A1) that extends generally perpendicular to a longitudinal axis (A2) of the charge-receiving layer 90.

In some examples, some conductive paths 100 include an end particle 61 directly exposed at first side 22A, while in some examples, some conductive paths 100 include an end particle 59 recessed from (i.e. spaced apart) first side 22A by a gap G1, as shown in FIG. 26. As further demonstrated via FIG. 2B, in some examples at least some of the conductive particles, such as 63, 64 are spaced apart from each other (represented by gap G2) along a first orientation generally parallel to the longitudinal axis (A1) of the elongate pattern 102. In this latter aspect, in some examples the particles 58 (such as 63, 64) do not form a contiguous structure or monolithic structure, but instead define an elongate band or elongate pattern of separate particles adapted to provide a conductive path to convey (i.e. facilitate migration) of charges. In some examples, the spacing (e.g. G2) along the Y orientation or in the X plane is non-uniform.

Figure 3A:
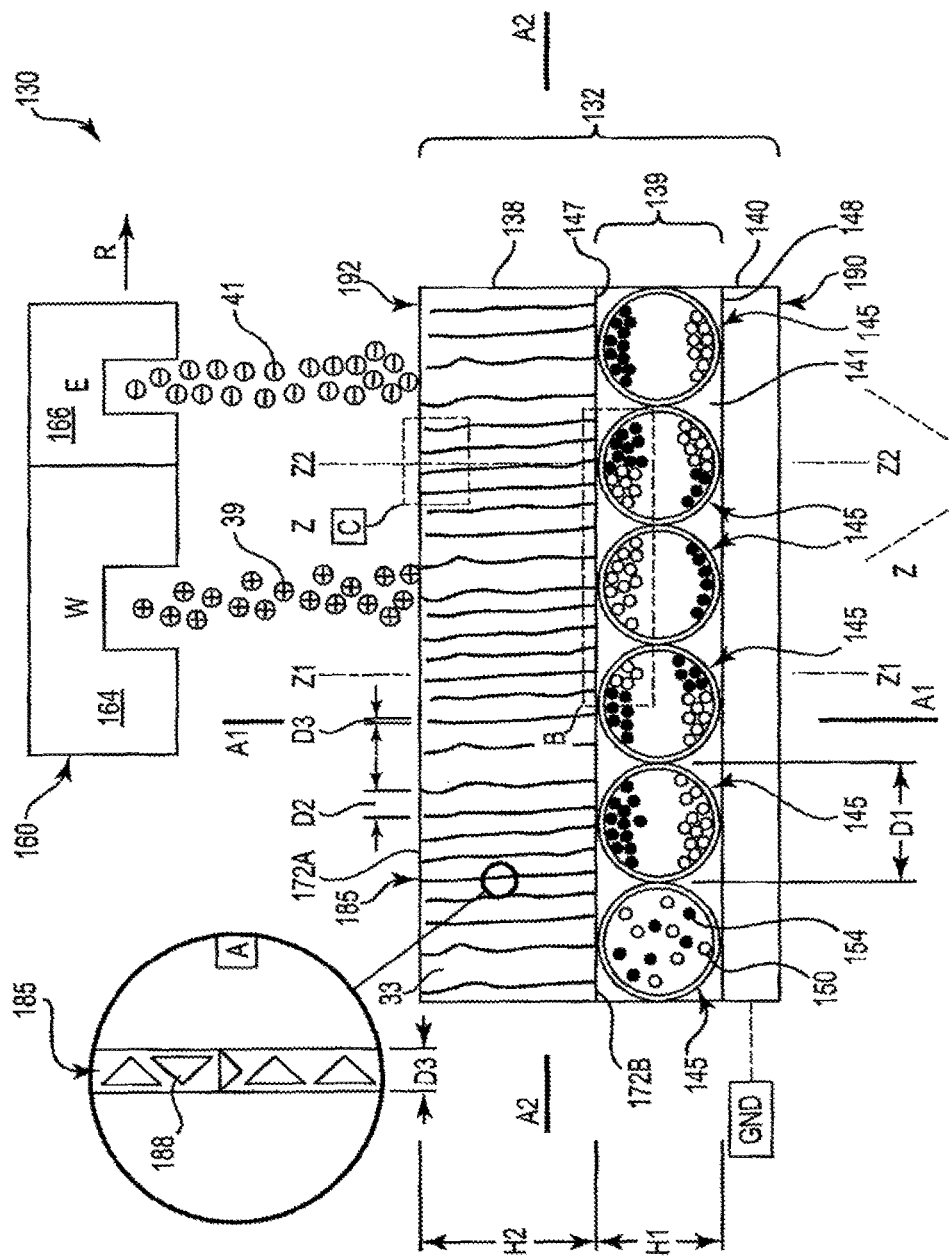
FIG. 3A is a sectional view schematically representing an e-paper assembly, according to an example of the present disclosure.

FIG. 3A is a diagram 130 including a side sectional view schematically representing an e-paper structure 132 and an associated e-paper writing module 160, according to one example of the present disclosure. In some examples, e-paper structure 132 is consistent with, and/or includes at least some of substantially the same features and attributes as e-paper display media previously described in association with at least FIGS. 1A-2. Meanwhile, writing module 160 is provided in FIG. 3A to generally illustrate a response of the e-paper structure 132 to air-borne charges emitted from an erasing unit 166 and/or a writing unit 164.

As shown in FIG. 3A, the writing module 160 includes writing unit 164 and an erasing unit 166. The writing unit 164 and erasing unit 166 both face a charge receiving surface 192 of the media, with the writing module 160 spaced apart from the surface 192. In some examples, this external writing module 160 is spaced apart (at least during erasing and/or writing) from the charge-receiving layer 138 by a distance of 125 µm to 2 millimeters.

In some examples, one or both of the writing unit 164 and erasing unit 166 comprises an ion-based head. In one example, the ion-based head is provided via a corona-based charge ejecting device. In some examples, an ion-based erasing unit 166 is replaced with an electrode that comes into close contact with, or that is dragged along, the surface 192 in front of the writing unit 164. As represented by arrow R, erasing and writing is performed upon relative movement between the writing module 160 and the e-paper structure 132.

In some examples, a surface 192 is sometimes referred to as an imaging side of the e-paper structure 132 and an opposite surface 190 is sometimes referred to as a non-imaging side of the e-paper structure 132.

In general terms, as shown in FIG. 3A, e-paper structure 132 includes a protective layer 138, a charge-responsive layer 139, and a base 140. The protective layer 138 is sometimes referred to as charge-receiving layer 138. The base 140 defines or includes a counter electrode, as further described below, which serves as a ground plane. In some examples, it will be understood that, even in the absence of layer 138, charge-responsive layer 139 is imageable by charges 39 and that layer 138 primarily is provided for protection of unintentional and/or malicious mechanical and electrical insults to charge-responsive layer 139. Nevertheless, in at least some examples of the present disclosure, the presence of the protective layer 138 facilitates producing and retaining quality images at charge-responsive layer 139 in the manner described herein.

In some examples, charge-receiving layer 138 is consistent with, and/or includes at least some of substantially the same features and attributes as layers 20, 40 (FIGS. 1A-2). In particular, as shown in FIG. 3A, charge-receiving layer 138 includes a plurality of generally parallel, spaced apart conductive paths 185, with each conductive path formed from an elongate pattern of separate conductive particles 188. As shown in the enlarged portion A of FIG. 3A, the conductive particles 188 are generally arranged in series.

Furthermore, it will be understood that particles 188 are not limited to the shapes shown in portion A of FIG. 3A and the shape of the particles 188 can vary depending on the type of material forming particles 188 and/or depending on the processing of the materials forming particles 188.

With further reference to at least FIG. 3A and consistent with at least FIG. 2B, in some examples, each conductive path 185 has a width or diameter (D3) with adjacent conductive paths 185 being spaced apart by a distance D2. In some examples, the spacing (D2) between adjacent conductive paths 185 is about 10 µm and can fall within range between 5 to 15 µm. Meanwhile, the width (D3) of the conductive paths 185 generally falls within a range between 2 and 6 µm, with the width (D3) depending on the viscosity of the insulative matrix 33 in which the conductive paths 185 are dispersed.

In some examples, the protective or charge-receiving layer 138 has a thickness of about 10 µm to about 200 µm. In some examples, the charge-receiving layer 138 has a thickness of about 50 µm to about 175 µm. In some examples, the charge-receiving layer 138 has a thickness of about 150 µm.

In some examples, the charge-receiving layer 138 has a thickness that is a multiple (e.g. 2×, 3×, 4×) of a thickness of a charge-responsive layer 139 to ensure robust mechanical protection of the charge-responsive layer 139. In one aspect of such examples, a thickness of the charge-responsive layer 139 generally corresponds to a diameter of microcapsules 145 (forming a monolayer).

In one aspect, the thickness and type of materials forming charge-receiving layer 138 are selected to mechanically protect the charge-responsive layer 139 (including microcapsules 145) from punctures, abrasion, bending, scratching, liquid hazards, crushing, and other impacts. Moreover, as further described later, in some examples the layer 138 also protects the charge-responsive layer 139 from tribo charges.

In addition, by providing preferential conductivity, charge-receiving layer 138 reduces unintentional increases in image dot size that might otherwise occur due to a blooming effect, as previously described.

In the example shown in FIG. 3A, the charge-responsive layer 139 includes a plurality of microcapsules 145 arranged in a monolayer. Each microcapsule 145 encapsulates some charged black particles 154 and some charged white particles 150 dispersed within a matrix 141, such as a dielectric liquid (e.g. an oil). In one example, as shown in at least FIGS. 3A and 5-8, the black particles 154 are positively charged and the white particles 150 are negatively charged while the erasing unit 166 produces negative charges and the writing unit 164 produces positive charges.

In some examples, the erasing unit 166 erases any information stored via the microcapsules 145 prior to writing information with the writing unit 164. In the example shown in FIG. 3A, upon relative motion between the e-paper structure 132 and the writing module 160, the negatively charged erasing unit 166 emits a stream of air-borne charges 41, which will result in removal of positively charged ions that are attached to the surface 147 of charge-responsive layer 139, as further illustrated in the enlarged view of FIG. 3B. The negatively charged erasing unit 166 also creates electrostatic forces that drive negatively charged white particles 150 away from the charge receiving layer 138 and attracts positively charged black particles 154 toward the charge receiving layer 138. By passing the erasing unit 166 over the charge receiving layer 138, any information previously written to the e-paper structure 132 is erased by positioning the positively charged black particles 154 near the top of the microcapsules 145 and pushing the negatively charged white particles 150 to the bottom of the microcapsules 145.

It will be understood that depending on whether a particular side 192 or 190 of e-paper structure 132 is opaque or transparent, a respective side 192 or 190 can be a viewing side or non-viewing side of the e-paper structure, as will be further noted later. However, regardless of which side 192 or 190 is a viewing side, side 192 will remain an imaging side of the e-paper structure 132.

Microcapsules 145 exhibit image stability using adhesion between particles and/or between the particles and the microcapsule surface. For example, microcapsules 145 can hold text, graphics, and images indefinitely without using electricity, while allowing the text, graphics, or images to be changed later.

In some examples, the diameter (D1) of each microcapsule 145 is substantially constant within charge-responsive layer 139 of e-paper structure 132 and, in some examples, the thickness (H1) of charge-responsive layer 139 is between about 20 µm and about 100 µm, such as 50 µm. In some examples, the charge-responsive layer 139 is arranged as a monolayer and has a thickness of generally corresponding to a diameter (D1) of the microcapsules, which in some examples, is about 30 to 40 µm.

In some examples, base 140 has a thickness between about 20 μm and about 1 mm, or larger depending on how e-paper structure 132 is to be used.

In one aspect, base 140 is structured to provide enough conductivity to enable counter charges to flow during printing. As such, in general terms, base 140 comprises a member including at least some conductive properties. In some examples, base 140 comprises a non-conductive material that is impregnated with conductive additive materials, such as carbon nanofibers or other conductive elements. In some examples, base 140 comprises a conductive polymer, such as a urethane material or a carbonite material. In further examples, base 140 is made from a conductive polymer with carbon nanofibers, to provide flexibility with adequate strength.

In some examples, base 140 is primarily comprised of a conductive material, such as an aluminum material and therefore is impregnated or coated with additional conductive materials.

In some examples, whether conductivity is provided via coating, impregnation or other mechanisms, the body of base 140 is formed from a generally electrically insulative, biaxially-oriented polyethylene terephthalate (BOPET), commonly sold under the trade name MYLAR to provide flexibility and strength in a relatively thin layer.

As noted elsewhere throughout the present disclosure, the base 140 is opaque or is transparent, depending on the particular implementation of the e-paper display media. In some examples, the base 140 comprises a generally resilient material, exhibiting flexibility and in some implementations, semi-rigid behavior. In some examples, the base 140 comprises a rigid material.

FIG. 3A also shows one example of a writing operation performed by the writing module 160 in which the deposition of charges within target zone Z (between dashed lines Z1, Z2) influences the distribution of charged pigments/particles within affected microcapsules 145. In one aspect, in order to form an image on e-paper structure 132, the writing unit 164 is designed and operated to selectively eject positive charges 39 toward the surface 192 of charge-receiving layer 138, when a region of the e-paper structure 132 (located beneath the writing unit 164) is to be changed from white to black (or vice versa in some examples). As noted above, conductive paths 185 extending through the charge-receiving layer 138 (between opposite sides 172A, 172B) facilitate passage of the deposited charges to the charge-responsive layer 139. It will be understood that the passage of charges 39 through charge-receiving layer 138 is limited to those locations (e.g. within target zone Z) at which charges were intentionally deposited by writing module 160.

In this example, as a resulting effect from the deposit of the positive charges 39 at charge-receiving layer 138, the positively charged black particles 154 (within the nearby microcapsules 145) are repelled and driven away from the surface 147 of charge-responsive layer 139, while the negatively charged white particles 150 (within nearby microcapsules 145) are attracted to the positive charges 39 and pulled toward the charge receiving surface 147, as further illustrated in the enlarged view of FIG. 3B.

In some examples, when at least a portion of base 140 is transparent and surface 190 comprises a viewing side of the e-paper structure 132, the areas of surface 147 having a positive charge will result in the microcapsules 145 (or portions of a microcapsule 145) producing a black appearance at surface 190 while the areas of surface 147 having negative charge will result in corresponding microcapsules 145 or portions of a microcapsule 145) producing a white appearance at surface 190. In some instances of this example, the charge-receiving layer 138 is opaque to facilitate clarity in viewing through transparent base 140 at surface 190. Accordingly, in this implementation, the charge-receiving layer 138 serves as an imaging side, but is a non-viewing side of the e-paper structure 132.

On the other hand, in some examples, when at least a portion of charge-receiving layer 138 is transparent and surface 192 comprises a viewing side of the e-paper structure 132, the areas of surface 147 having a positive charge will result in the microcapsules 145 (or portions of a microcapsule 145) producing a white appearance at surface 192 while the areas of surface 147 having negative charge will result in corresponding microcapsules 145 (or portions of a microcapsule 145) producing a black appearance at surface 192. In some instances of this example, the base 140 is opaque to facilitate clarity in viewing through transparent charge-receiving layer 138 at surface 192. Accordingly, in this implementation, the charge-receiving layer 138 serves as both an imaging side and a viewing side of the e-paper structure 132.

In some examples, as shown in FIG. 3A, during writing and erasing electrical contact is made by a ground resource (GND), associated with writing module 160, with exposed portions of base 140 to allow biasing of the writing module 160 while it directs charges to charge receiving layer 138 during the writing process.

The e-paper writing module 160, as shown in FIG. 3A, is not limited to implementations in which the writing unit 164 produces positive charges and the erasing unit 166 erases information with negative charges. Instead, in some examples, the microcapsules 145 in matrix material 141 of the charge-responsive layer 139 of e-paper structure 132 are composed of negatively charged black particles 154 and positively charged white particles 150. In such examples, the writing unit 164 is designed to produce negative charges (e.g. negatively charged ions), while the erasing unit 166 uses positive charges to erase information stored in the microcapsules 145 of the charge-responsive layer 139 of the e-caper structure 132.

In one aspect, it will be understood that in at least some examples of the present disclosure, the e-paper structure 132 operates without an applied voltage at surface 192 (e.g. side 172A of layer 138) and without an electrically-active conductive element in contact with surface 192. Instead, via the presence of the counter electrode 140 (e.g. base) and the established ground path, air-borne charges produced via writing module 160 arrive at surface 192 and flow to charge-responsive layer 139 through targeted preferential conductive paths in charge-receiving layer 138.

With reference to the enlarged view of FIG. 3C as taken from FIG. 3A (represented by marker C), in some examples in which conductive particles 188 are magnetically responsive, an insulative matrix 243 of a charge-receiving layer further includes a plurality 245 of non-magnetically-responsive conductive elements 247 dispersed throughout the insulative matrix 243, such as between the conductive paths 185 (made of magnetically-responsive particles 188). It will be understood that for illustrative purposes, conductive elements 247 are not necessarily shown to scale in FIG. 3C. In some examples, the conductive elements 247 slightly augment the conductivity of the insulative matrix 243 to provide anti-static, protective qualities without otherwise disrupting the anisotropic conductivity provided via the conductive paths. In other words, while the conductive paths 185 facilitate passage of intentionally deposited charges from writing module 160 (FIG. 3A), the non-magnetic conductive elements 247 act as a secondary charge dissipation mechanism for residual and/or tribo charges on surface 192 of the e-paper structure. In this way, the non-magnetic conductive elements help to prevent inadvertent disturbance of an image formed at charge-responsive layer 139 of e-paper structure 132 (FIG. 3A), and their presence contributes to the stability and clarity of an image written to charge-responsive layer 139 of e-paper structure 132. In one aspect, because the conductive elements 247 are non-magnetically-responsive, their location is unaffected during formation of the charge-receiving layer 138 when particles 188 are subjected to a magnetic field to cause their alignment into conductive paths 185.

Figure 3D:
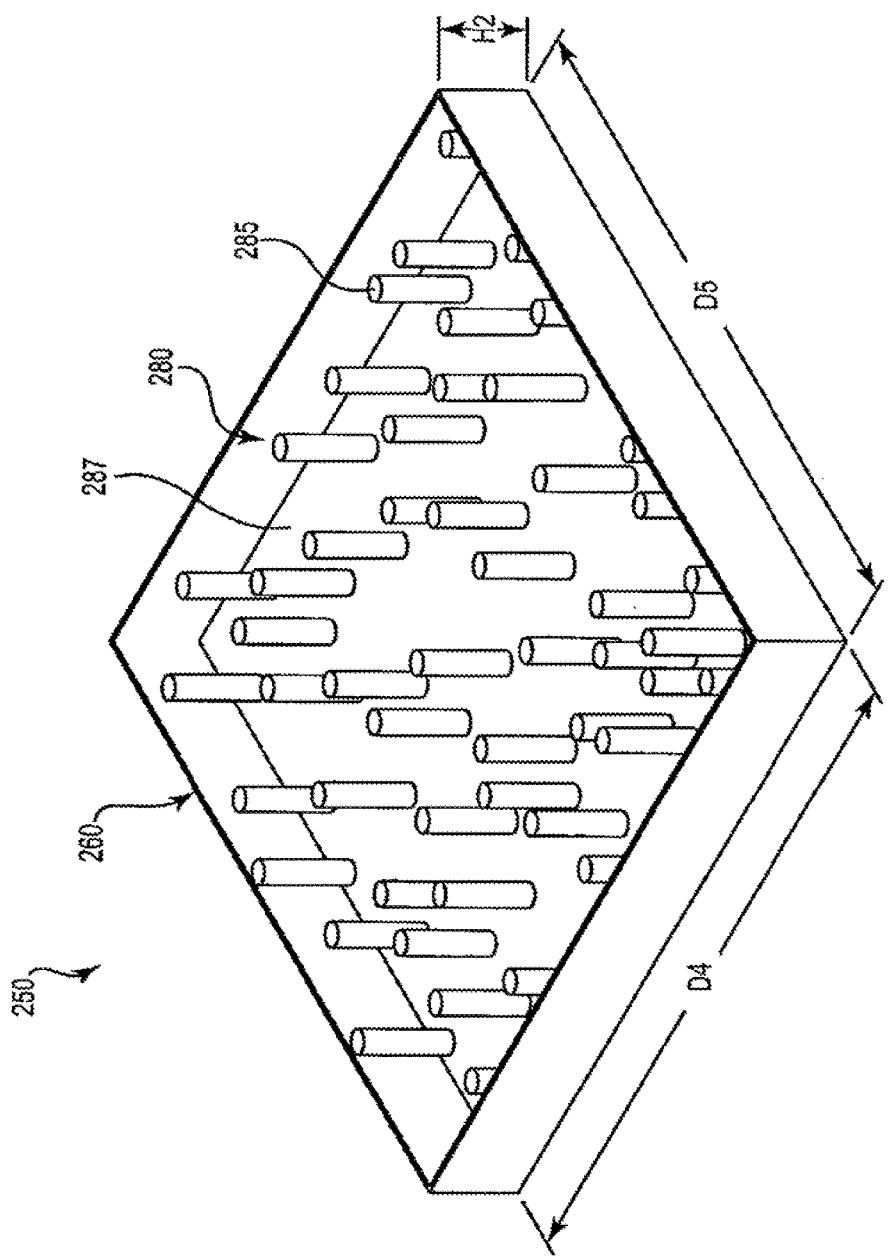
FIG. 3D is a perspective view schematically representing a coating layer, according to an example of the present disclosure.

FIG. 3D is a diagram 250 including a perspective view schematically representing a portion of a charge-receiving layer 260 of an e-paper structure, according to an example of the present disclosure. In one example, the charge-receiving layer 260 is consistent with, and/or includes at least some of substantially the same features and attributes, as charge-receiving layer 138 as previously described in association with at least FIGS. 3A-3O. As shown in FIG. 3D, the example portion of the charge-receiving layer 260 includes a plurality 280 of conductive paths 285 with each conductive path 285 formed via magnetically-alignable conductive particles. The example portion exhibits a height (H2) in the z-direction and in the x-y direction, has a width (D4) and length (D5). Among other attributes, FIG. 3D illustrates a relative density of the conductive paths 285 within a given portion of the charge-receiving layer 138. In some examples, the density of conductive paths 285 is at least partly controllable based on a viscosity of the insulative matrix 287.

It will be understood that the conductive paths 285 are shown in FIG. 3D resembling columnar structures solely for illustrative simplicity to depict geometric and spatial relationships for a charge-receiving layer, and that the conductive paths 285 would actually be implemented via elongate patterns of separate conductive particles, as previously described in at least FIGS. 1B, 2B, 3A, etc.

Figure 4A:
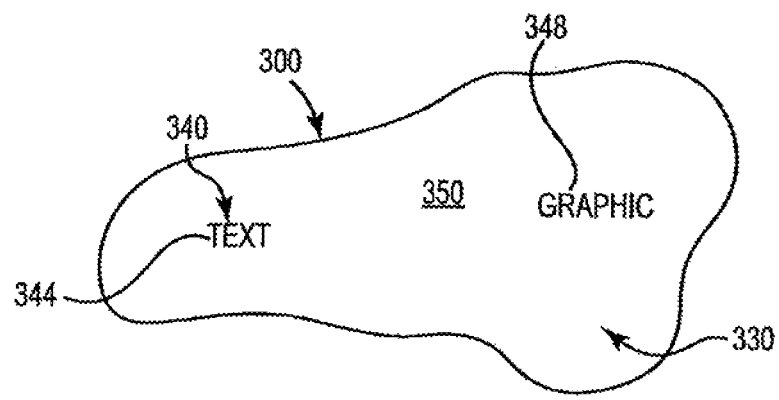
FIG. 4A is a top elevational view schematically representing a display media, according to an example of the present disclosure.

FIG. 4A is top plan view schematically representing a portion of an e-paper display media 300, according to an example of the present disclosure. As shown in FIG. 1A, display media 300 includes image-bearing face 330.

As further described below in more detail, e-paper display media 300 incorporates e-paper structure like e-paper structure 132 as previously described in association with at least FIG. 3A. Accordingly, in some examples, the image-viewable surface (i.e. image-bearing surface) 330 corresponds to the image-writing surface (e.g. surface 192 in FIG. 3A) of the e-paper display media 300 while in some examples, the image-viewable surface (i.e. image-bearing surface) corresponds to a non-image-writable surface (e.g. surface 190 in FIG. 3A) of the e-paper display media 300.

As shown in FIG. 4A, in some examples e-paper display media 300 bears an image 340, in some examples, image 340 includes text 344 and/or graphics 348 positioned among the remaining blank portion 350. It will be understood that in this context, in some examples, graphics also refers to an image, such as specific picture of a person, object, place, etc. Moreover, the particular content of the information in image 340 is not fixed, but is changeable by virtue of the rewritable nature of the e-paper structure 132 incorporated within display media 300. In one example, a location, shape, and/or size of text 344 and/or graphics 348 of an image 340 is also not fixed, but is changeable by virtue of the rewritable nature of the e-paper display media 300.

In at least some examples of the present disclosure, an e-paper structure (e.g. e-paper structure 132 in FIG. 3A) forming at least a portion of display media 300 is a passive e-paper display. In one aspect, the e-paper display 300 is passive in the sense that it is re-writable and holds an image without being connected to an active power source during the writing process and/or after the writing is completed. Instead, as previously described, the passive e-paper structure 132 is imaged in a non-contact manner in which the e-paper display 300 receives charges (emitted by a on head) that travel through the air and then forms the image 340 via a response by charged particles within the charge-responsive layer 139 of the e-paper structure 132. After the imaging process is completed, the passive e-paper display 300 retains the image generally indefinitely and without a power supply until image 340 is selectively changed at a later time.

In some examples, an e-paper structure forming display media 300 and that includes a charge-receiving layer (such as charge-receiving layer 138 in FIG. 3A or in later FIGS. 5-8) is not strictly limited to the particular type of charge-responsive layer 139 previously described in association with at least FIG. 3A. Rather, in some examples, the charge-responsive layer forming an e-paper assembly (onto which a charge-receiving layer according to at least some examples of the present disclosure) operates at least consistent with general electrophoretic principles. With this in mind, in some examples, such charge-responsive layers include charged color particles (other than microcapsules 145) that switch color when charges are selectively applied a non-contact manner by an external writing module. In some examples, the charged color particles comprise pigment/dye components.

In some examples, an e-paper structure incorporated within display media 300 is constructed via placing celled structures between two containing walls. In some examples, an e-paper structure incorporated within display media 300 includes air borne particles insides capsules, such as a "quick response liquid powder display" formerly available from Bridgestone Corporation of Tokyo, Japan.

With further reference to FIG. 4A, in some examples, the image 340 appearing on face 330 of display media 300 results from writing the image at resolution of 300 dots-per-inch. In some examples, image 340 is written at greater or less resolutions than 300 dots-per-inch.

Figure 4B:
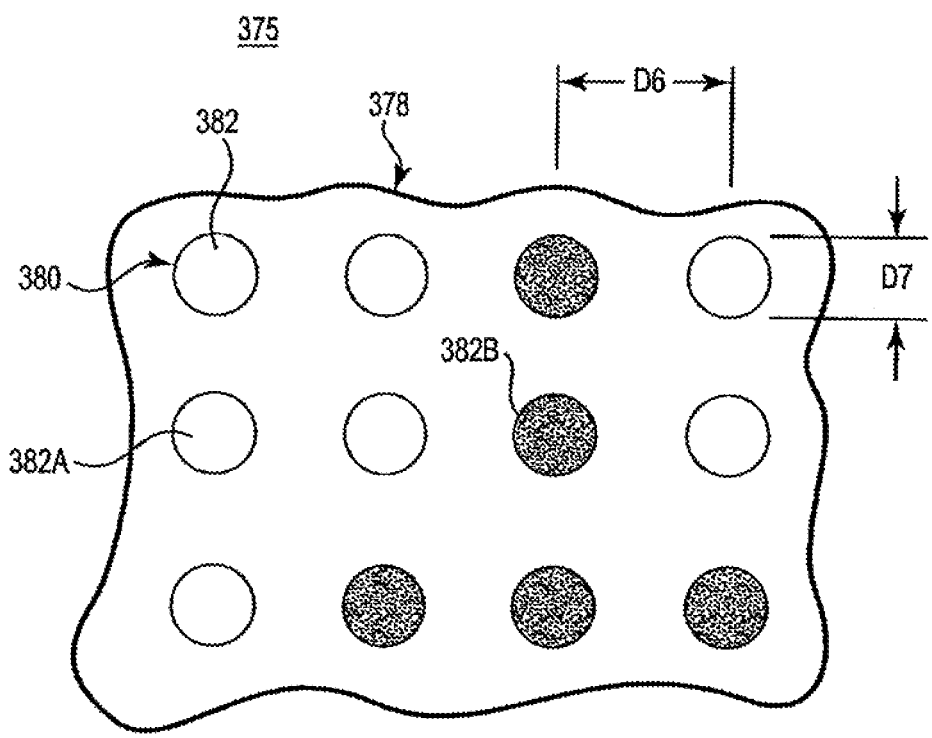
FIG. 4B is a top view schematically representing a dot-by-dot portion of an image, according to an example of the present disclosure.

With this in mind, FIG. 4B is a diagram 375 including a top plan view of a portion 378 of image 340, according to one example of the present disclosure. As shown in FIG. 4B, diagram 375 includes a layout 380 of dots 382, each of which can be written as black dots or white dots based on a response of the underlying e-paper structure 132 to deposited charges selectively targeted in a manner corresponding to the pattern of image 340. As shown in FIG. 4B, the portion 378 of image 340 includes some white dots 382A and some black dots 382B. The white dots 382A appear as blank portion 350 in image 340 shown in FIG. 4A, while the black dots 382B appear as a portion of text 344, graphic 348, etc. A center-to-center spacing between dots 382 is represented by distance D6 while a diameter of each dot 382 is represented by distance D7. In one example, to achieve a 300 dpi image, the distance D6 is 84 microns and the diameter (D7) of each dot 382 is about 80 to 100 microns.

With this in mind, in some examples, a black dot 382B typically corresponds to several (e.g. 3-4) microcapsules 145 in charge-responsive layer 139 of e-paper structure 132, as represented in at least FIGS. 3A-3B. In one aspect, the deposited charges 39 (that correspond to formation of one black dot 382B (FIG. 4B)) correspond to at least the microcapsules 145 (or portions of microcapsules) within target zone Z in FIG. 3A.

Figure 5:
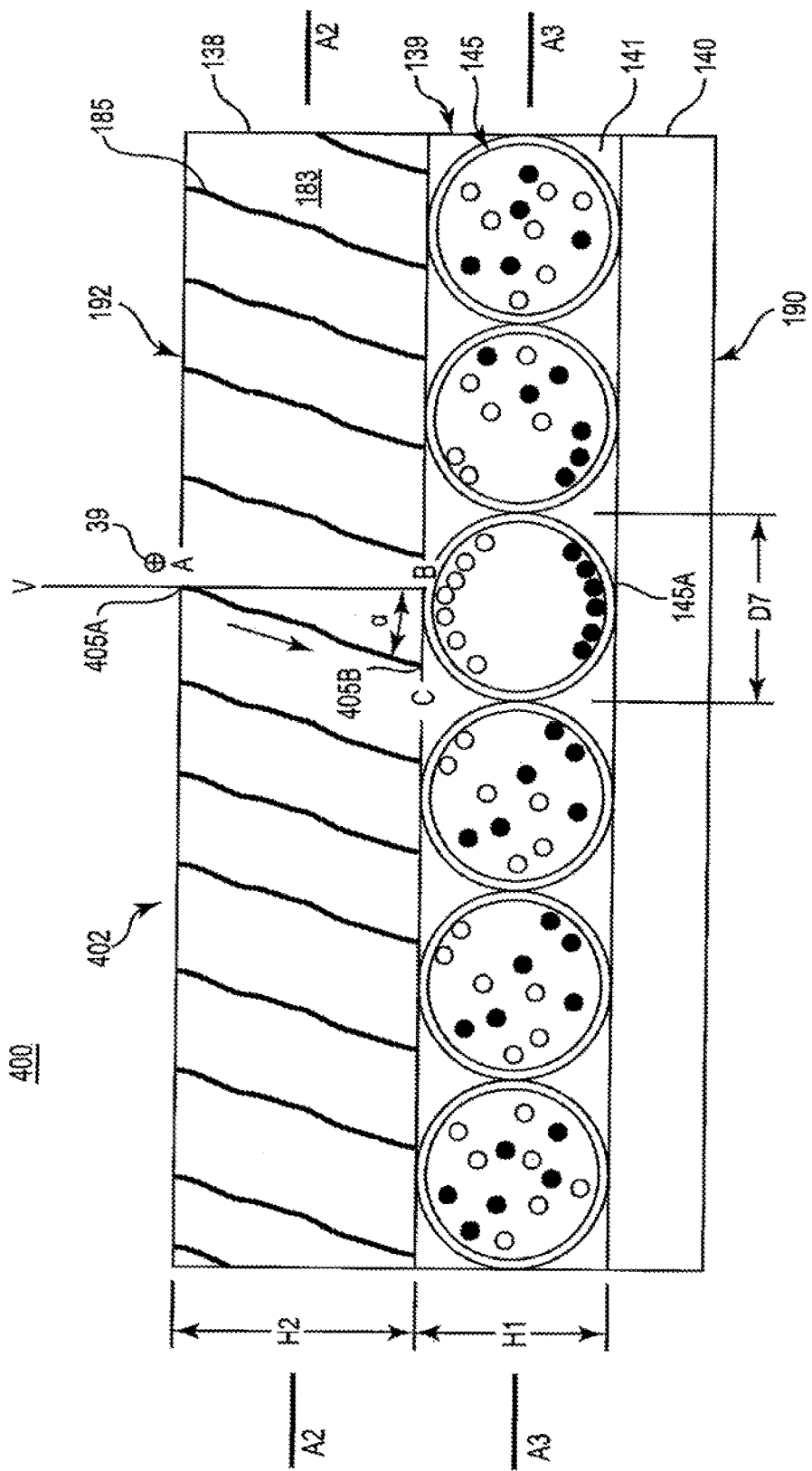
FIG. 5 is a diagram including a sectional side view schematically representing an e-paper assembly, according to an example of the present disclosure.

FIG. 5 is a diagram 400 including a side sectional view schematically representing an e-paper structure 402, according to an example of the present disclosure. In one example, the e-paper structure 402 is consistent with, and/or includes at least some of substantially the same features and attributes as e-paper structure 132, as previously described in association with at least FIG. 3A. However, in diagram 400 the conductive paths 185 within charge-receiving layer 138 extend at an angle (α) relative to a vertical plane V, which is also represented by the line segment A-B. Plane V extends generally perpendicular to a longitudinal axis A3 of charge-receiving layer 139 and A2 of charge-receiving layer 138. In one aspect, line segment A-C generally corresponds to a length of an angled conductive path 185 while line segment A-B corresponds to a height (H2) of the charge-receiving layer 138. In another aspect, FIG. 5 shows line segment B-C, which corresponds to a lateral distance from the vertical plane V to an end 405B of an angled conductive path 185.

The distance of line segment B-C corresponds to a lateral deviation in the placement of a charge at the charge-responsive layer 139 that occurs due to the conductive paths 185 being formed at the angle (α) instead of generally parallel to the plane V.

As further described below, at least an adequate resolution is maintained in the resolution of an image despite a small lateral deviation (as represented by line segment B-C) in charge placement when the conductive paths 185 are formed with a slight non-vertical angle. In one example, assuming a configuration including a thickness (H2 or line segment A-B) of charge-receiving layer 138 of 150 μm and an angle (α) of 5 degrees from plane V, a lateral deviation (line segment B-C) of about 13 μm would occur. Given a dot-to-dot spacing of 84 μm between imageable "dots" (having a diameter of about 80 to 100 μm) provided via writing module 160 (FIG. 3A), a lateral deviation of about 13 μm at the charge-responsive layer 139 is generally acceptable for 300 dpi imaging.

In some examples, as previously described in association with at least FIG. 1A, a combined conductivity of all the conductive paths 32 in charge-receiving layer 138 is at least one order of magnitude greater than the conductivity ($\sigma_{body}$) of insulative matrix 33. Moreover, in some examples, a first ratio of this combined conductivity of all the conductive paths 32) relative to the conductivity of the insulative matrix 33 is proportional to a second ratio of a thickness of the charge-receiving layer 138 relative to a maximum allowable lateral travel (e.g. lateral deviation represented by line segment B-C in FIG. 5) of a charge in the insulative matrix 33.

In some examples, these relationships exhibited within a charge-receiving layer 138 are further represented by the equation:

$$d_Z/d_{XY} \sim vd_Z/vd_{XY} \sim \sigma_Z/\sigma_{XY} \sim \rho_{XY}/\rho_Z,$$

where XY represents an XY plane, Z represents a Z axis orthogonal to the XY plane, where d represents a traveled distance, vd represents a drift velocity of charges, σ represents conductivity, and ρ represents resistivity.

Accordingly, in some examples, to achieve a lateral deviation less than 10 μm then the charge-receiving layer 138 will exhibit a resistivity ratio ($\rho_{XY}/\rho_Z$) larger than 15.

Figure 6:
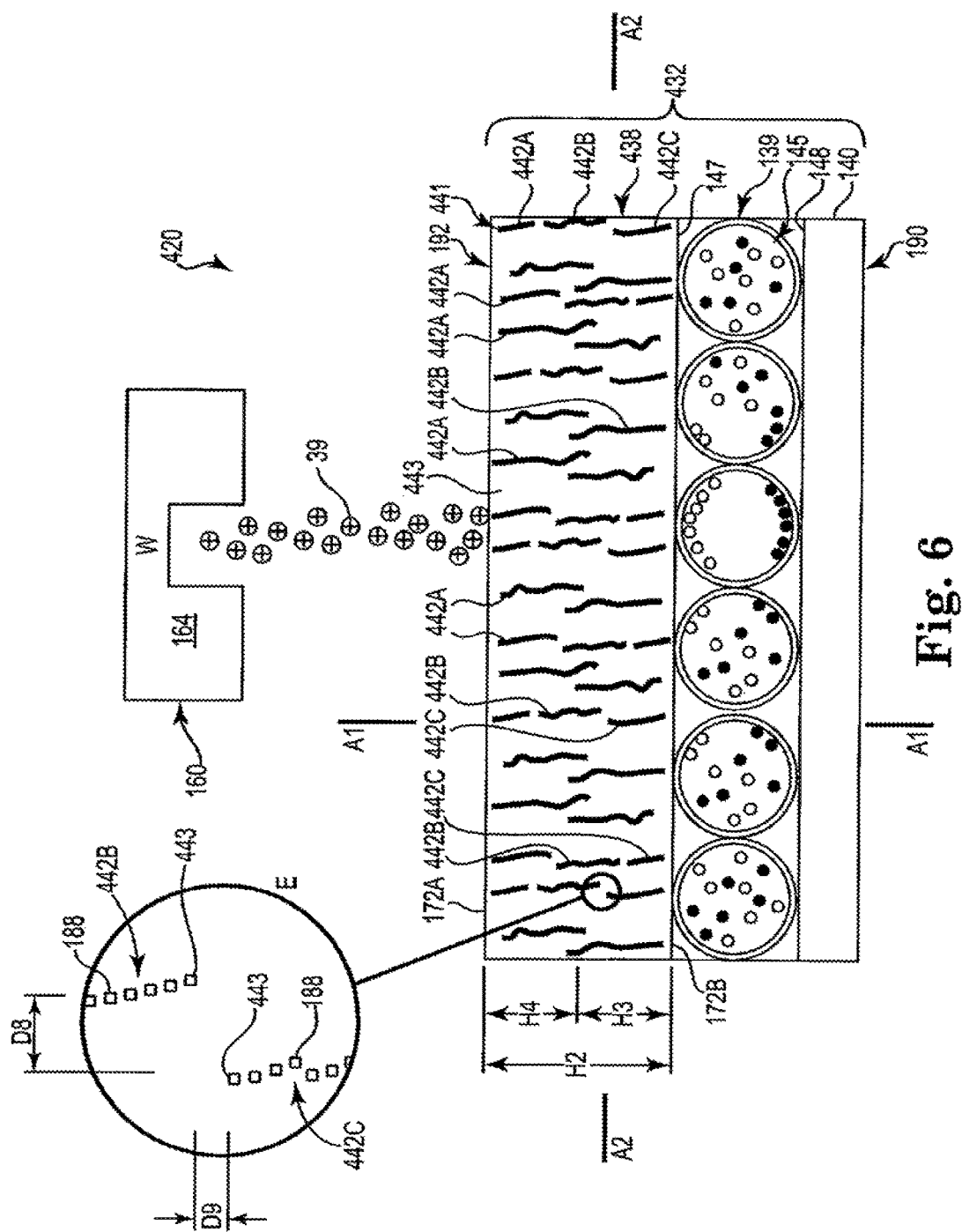
FIG. 6 is a diagram including a sectional side view schematically representing an e-paper assembly and a side view of an imaging head, according to an example of the present disclosure.

FIG. 6 is diagram 420 including a side sectional view of an e-paper structure 432, according to one example of the present disclosure. In one example, the e-paper structure 432 is consistent with, and/or includes at least some of substantially the same features and attributes as, e-paper structure 132 (as previously described in association with at least FIG. 3A), except with e-paper structure 432 having conductive paths 441 formed from spaced apart segments 442A, 442B, 442C instead of a conductive path 185 formed as a single elongate pattern that extends the full thickness (H2) of the charge-receiving layer 138, as in at least FIG. 3A.

In particular, for comparison purposes, in the example of charge-receiving layer 138 of FIG. 3A, a single conductive path 185 generally provides a single elongate pattern of conductive particles 58 to convey (i.e. facilitate passage) of charges through the entire thickness of the charge-receiving layer 138. However, in the example of e-paper structure 432 shown in FIG. 6, charge-receiving layer 438 includes a plurality of generally parallel, spaced apart elongate conductive paths 441, with each path 441 including a series of two or three (or more) conductive segments of field-aligned conductive particles. As shown in FIG. 6, some elongate conductive paths 441 include three separate or distinct segments 442A, 442B, 442C aligned in generally end-to-end configuration (with some lateral spacing) and that, in some examples, function as a single elongate conductive path 441 to facilitate passage of charges through charge-receiving layer 138. FIG. 6 illustrates that, in some examples, a first segment 442A has a height H4 and that a second segment (or a combination of a second segment 442B and third segment 442C) has a height H3, with a sum of H3 and H4 generally corresponding to the total height (H2) of charge-receiving layer 438.

As further shown in the enlargement portion (labeled E) in FIG. 6, in some examples, an end 443 of one segment 442B is vertically spaced apart from (i.e. forms a gap relative to) an end 443 of an adjacent segment 442C by a distance (D9) while the end 443 of one segment 442B is horizontally spaced apart from (i.e. forms a gap relative to) the end of adjacent segment 442C. In one aspect, enlargement portion E further illustrates that each segment is formed from an elongate pattern of conductive particles 188. In some examples, the distance D8 and distance D9 is no greater than 10 percent of a length of one of the respective segments 442B, 442B. Given a reasonably small spacing, charges are able to travel through charge-receiving layer 438 by jumping such vertical gaps and/or horizontal gaps. In one aspect, the arrangement of a conductive path 441 (as a series of separate segments 442A, 442B, 442C) demonstrates that elongate patterns of conductive particles for conveying charges need not be formed into homogeneous conductive paths each having a uniform shape, length, position in order for conveying charges. Nevertheless, the arrangement of elongate conductive paths 441 in e-paper structure 432 (FIG. 6) does maintain generally parallel, spaced apart paths of preferential conductivity within an insulative matrix 433.

In some examples, the multiple, spaced apart segments forming elongate conductive paths 441 in FIG. 6 aids in preventing attempted tampering with a written image on the charge-responsive layer 139, such as might be attempted via a charged stylus of pointed electrode, because any unwanted electrical charges from these contact-based electrical sources would be limited to traveling just the first segment (e.g. 442A) nearest the surface 192. However, in some examples, the free charges deposited by the external writing module 160, in at least some examples of the present disclosure, would be free to jump along the segments 442A, 442B, and 442C to reach the charge-responsive layer 139.

Figure 7:
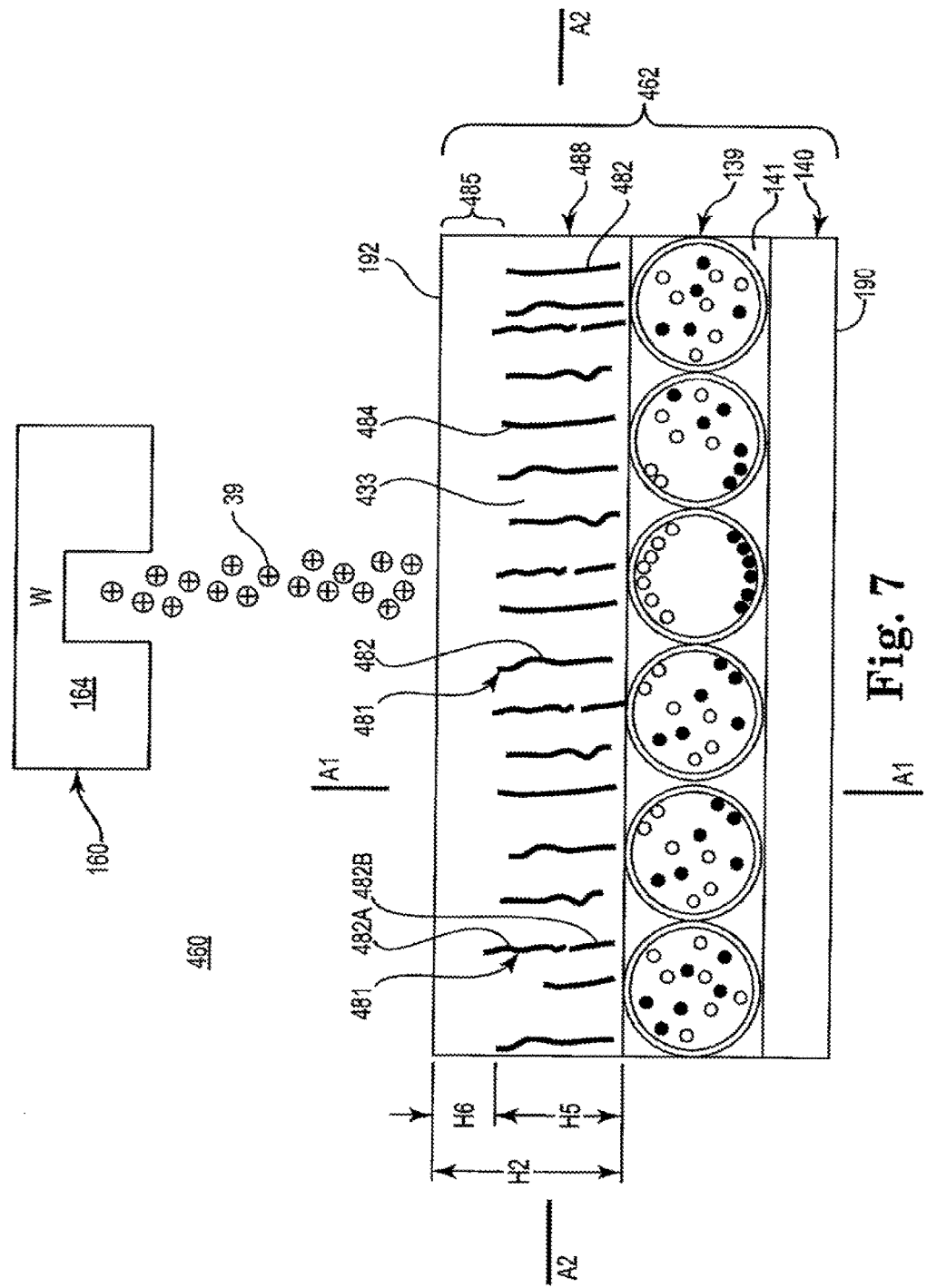
FIG. 7 is a diagram including a sectional side view schematically representing an e-paper assembly and a side view of an imaging head, according to an example of the present disclosure.

FIG. 7 is a diagram 460 including a side sectional view of an e-paper structure 462, according to one example of the present disclosure. In one example, the e-paper structure 462 is consistent with, and/or includes at least some of substantially the same features and attributes as, e-paper structure 432 (FIG. 6), except with e-paper structure 462 having elongate conductive paths 481 provided via spaced apart, separate segments 482A, 482B that, when combined in series, do not extend the full height H2 of the charge-receiving layer 488. In particular, the elongate conductive paths 481 are formed from one segment 482 or from two generally end-to-end segments 482A, 482B with each elongate conductive path 481 having a height H5 that is less than the full height H2 of charge-receiving layer 488. In this configuration, a top portion 485 of charge-receiving layer 488 generally does not include any preferential conductive segments and has a height H6. In one aspect, in this configuration the deposited charges 39 are not subject to preferential conductive pathways within charge-receiving layer 488 until the charges 39 have traveled through top portion 485, and then the charges 39 are conveyed through one of the generally parallel, spaced apart elongate conductive paths 481.

In one aspect, this configuration achieves preferential conductive passage of charges 39 while consuming a lower volume of particles than configurations having full height conductive paths, such as conductive paths 185 in FIG. 3A. In addition, the top portion 485 inhibits image disruptions from unintentional or malicious electrical insults because the end 484 of the elongate conductive paths 481 is not directly accessible at surface 192. Moreover, despite the generally insulative nature of the matrix 433 forming top portion 485, enough conductivity is present for charges deposited at surface 192 to migrate to top end 484 of segments 482A.

Figure 8:
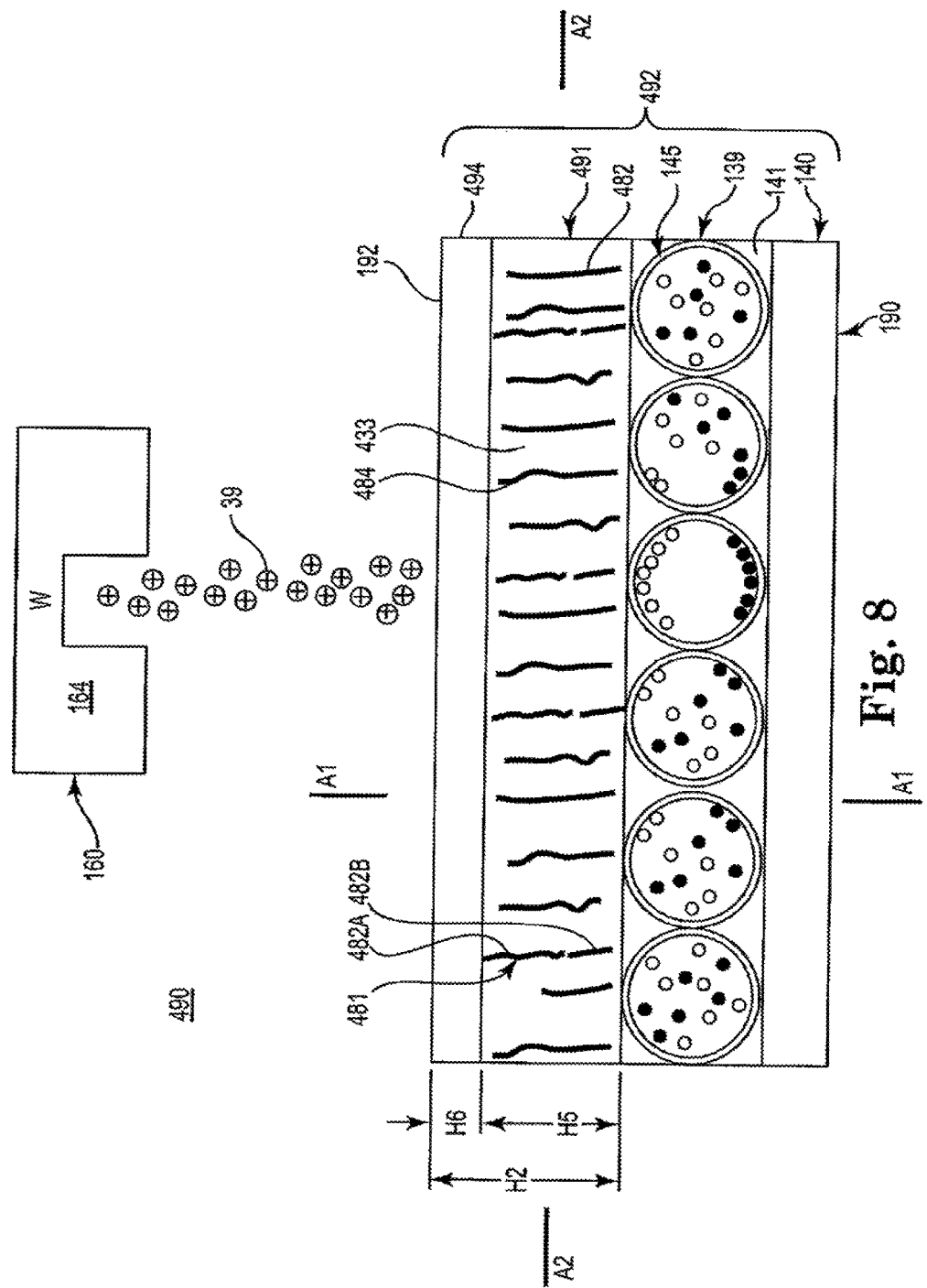
FIG. 8 is a diagram including a sectional side view schematically representing an e-paper assembly and a side view of an imaging head, according to an example of the present disclosure.

FIG. 8 is a diagram 490 including a side sectional view of an e-paper structure 492, according to one example of the present disclosure. In one example, the e-paper structure 492 is consistent with, and/or includes at least some of substantially the same features and attributes as, e-paper structure 482 (as previously described in association with at least FIG. 7), except with a separate top portion 494 that omits preferentially conductive segments 481. In one aspect, charge-receiving layer 491 has a height H5, which is less than the full height H2 with top portion 494 having a height H6. In some examples, charge-receiving layer 491 includes at least substantially the same features and attributes as charge-receiving layers 138 (FIG. 3A) or charge-receiving layer 438 of FIG. 6.

In one aspect, the top portion 494 is made of a material different than the insulative matrix 433 (i.e. conductive-resistant medium) of charge-receiving layer 491. This different material in top portion 494 provides scratch resistance, toughness, and strength while still permitting deposited charges to pass through top portion 494, while still on target, to be conveyed via the elongate conductive paths 481 extending through insulative matrix 433 of charge-receiving layer 491.

In some examples, the material forming top portion 494 exhibits greater strength, toughness, etc, than the material forming insulative matrix 433. In some examples, the material forming top portion 494 has a greater degree of conductivity than insulative matrix 433 to facilitate passage of deposited charges until the charges reach end 484 of an upper segment 482A of the elongate conductive paths 481.

Figure 9:
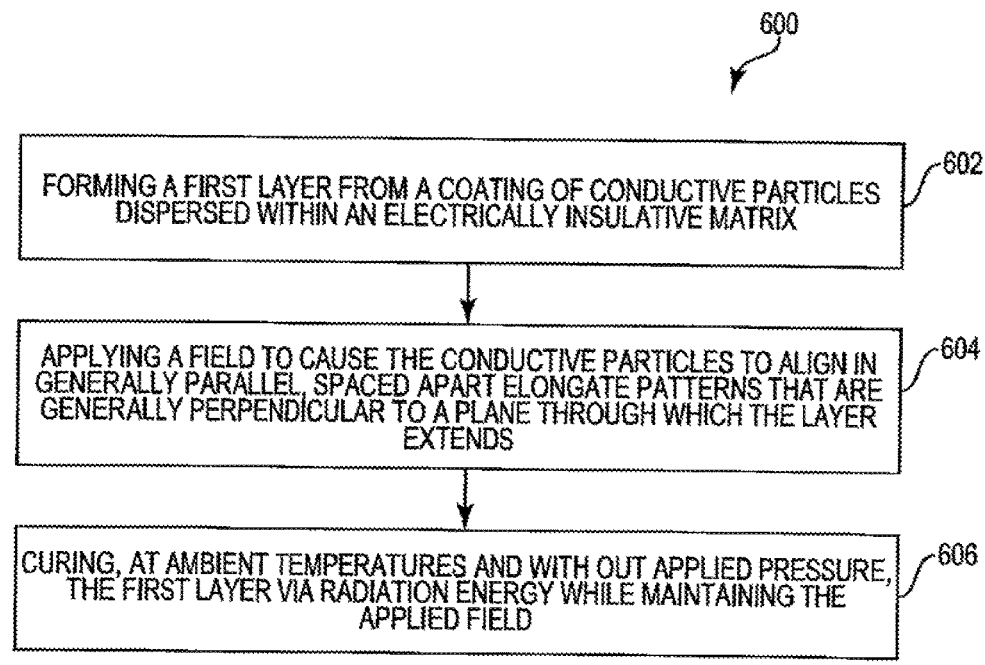
FIG. 9 is a diagram including a flow diagram schematically representing a method of forming a coating layer, according to an example of the present disclosure.

FIG. 9 is a flow diagram schematically representing a method 600 of manufacturing a coating for an e-paper structure, according to an example of the present disclosure, in some examples, the method 600 is consistent with, and/or includes at least some of the components, materials, configurations, as previously described in association with FIGS. 1A-8, and/or method 600 can be applied to manufacture at least some of the components, materials, and configurations provided in association with FIGS. 1A-8.

As shown in FIG. 9, method 600 includes (at 602) forming a first layer as coating of conductive particles dispersed within an insulative matrix and at 604, applying a field to cause the conductive particles to align in generally parallel, spaced apart elongate patterns that are generally perpendicular to a plane through which the first layer extends. At 606, method 600 includes curing, at ambient temperatures and without applied pressure, the first layer via radiation energy while maintaining the applied field.

In some examples, the particles are magnetically responsive and the field is a magnetic field.

Figure 10:
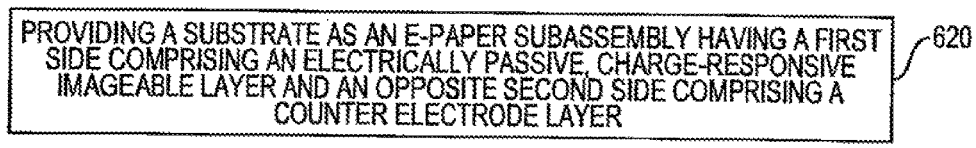
FIG. 10 is a diagram including schematically representing a portion of a method of forming a coating layer, according to an example of the present disclosure.

In some examples, the method 600 further includes providing a substrate as an e-paper assembly having a first side comprising an electrically passive, charge-responsive layer and an opposite second side comprising a counter electrode layer, as shown at 620 in FIG. 10. In one aspect, the first layer is formed onto, or transferred onto, the first side of the e-paper assembly.

In some examples, other forms of substrates are used prior to formation of the final e-paper structure including a charge-receiving layer.

Further details regarding the manufacture of a protective coating layer according to at least some examples of the present disclosure are provided below.

In some examples, during preparation of the first layer, such as a charge-receiving layer (e.g. 40 in FIG. 1B, 138 in FIG. 3A), an insulative matrix (33 in FIG. 1B) is selected to provide an electrical resistance $>10^{12}$ Ω-cm. In some examples, the electrical resistance of the insulative matrix is at least $10^6$ to $10^9$ Ohms. In some examples, the electrical resistance of the insulative matrix is $10^9$ to $10^{12}$ Ohms.

In some examples, the insulative matrix and conductive particles (FIG. 3A) are selected such that the resistance ratio ($\rho_{metal}/\rho_{matrix}$) between the conductive particles (such as particles 58 that form elongate patterns 56 in at least FIG. 1B) and the insulating matrix (e.g. 33 in FIG. 1B) is greater than $10^2$. At least some examples of appropriate insulative matrix materials include, but are not limited to, any organic and inorganic forms of mono-, co-, cyclic, block, star and random polymers composed of urethanes, acrylates, methacrylates, silicone, epoxies, carbonates, amides, imine, lactones, saturated linear and/or branched hydrocarbons, unsaturated and/or branched olefins, and aromatics. In some examples, these examples include epoxies and silicone rubbers.

With this in mind, in at least some examples, the insulative matrix is made at least partially from a semi-conductive material and/or materials having charge-dissipative qualities. Accordingly, the insulative matrix is considered to be substantially insulative and is not, strictly speaking, an absolute electrical insulator. Rather, the insulative matrix of the charge-receiving layer is considered substantially insulative because it is insulative relative to the conductive paths (of elongate patterns of conductive particles), but is otherwise not a strict insulator.

In one aspect, such polymers are curable from liquid (viscosity ranging from 10 cP-10,000 P) to solid (hardness range from shore A-D), with or without color, using radiation energy in any wavelengths at ambient temperatures and without pressure. In one example, the polymers are UV-curable and the applied radiation energy falls within the UVA-UVB range.

In some examples, the conductive particles (e.g. particles 58 in FIG. 1B, 188 in FIG. 3A) include any materials that respond to a magnetic field. In some examples, these magnetically-responsive materials are diamagnetic, paramagnetic, ferromagnetic, ferromagnetic, or antiferromagnetic. In some examples, the material(s) forming the particles 58, 188 are electrically conductive or semi-conductive provided that the particles 58, 188 exhibit conductivity that is significantly greater than the conductivity of the insulative matrix (i.e. conductive-resistant medium). In one example, the particles 58, 188 exhibit conductivity that is at least two orders of magnitude (e.g. $10^2$) greater than the conductivity of the insulative matrix. In some examples, materials suitable to serve as conductive particles (e.g. 58,188, etc.) generally include, but are not limited to, pure transition metals, pure lanthanides, transition metal oxides, lanthanide oxides, and complexes of metals from the transition metals and lanthanides. In some examples, the conductive particles are made from pure forms of metals selected from the group including Nickel, Neodymium, Iron, Cobalt, and magnetite ($Fe_3O_4$), or made from oxides or complexes of Nickel, Neodymium, Iron, Cobalt, and magnetite.

In some examples, the conductive particles have a maximum dimension no greater than 10 µm. In some examples, the conductive particles have a maximum dimension no greater than 5 µm. In some examples, the conductive particles have a maximum dimension no greater than 1 µm. In some examples, the conductive particles have a maximum dimension no greater than 100 nanometers. It will be understood that, in this context, maximum dimension refers to a maximum dimension in any orientation (e.g. length, width, depth, height, diameter, etc.). In some examples, the particles vary in size within a given elongate pattern, which in some instances, facilitates formation of the elongate patterns. In some examples, at least some of the particles have an aspect ratio of 1, which in some instances, facilitates their alignment into elongate patterns, unlike other types of conductive elements such as rods having a high aspect ratio (length/width), which can hinder alignment when subjected to a field at least due to physical interference of the rods with each other.

Once the appropriate materials are gathered as described above, an anisotropic conductive coating is prepared according to one of several non-limiting examples described below. In some examples, the conductive particles are dispersed directly within the insulative matrix. In some examples, the conductive particles are dispersed (e.g. in a solvent) prior to mixing with the insulative matrix. These examples are further described below.

In one example of preparation including direct dispersion, magnetite particles ($Fe_3O_4$) are obtained and Polymer 3010 (P3010) from Conductive Compounds, Inc. of Hudson, N.H. is obtained and used without further preparation. In one example, the magnetite particles are obtained from a vendor, such as Sigma-Aldrich of St. Louis, Mo. and used without further preparation.

To a clean container, 0.28 g of magnetite (i.e. $Fe_3O_4$) and 2.5 g of the P3010 polymer are combined into a mixture. In some examples, 15 g of 3 mm zirconia beads are then introduced to the mixture to facilitate dispersion of the magnetite during milling. The charged container was then subjected to centrifugal milling in a tool such as Speed mixer for increments of 30 seconds until the resulting mixture was homogenous, such as when the mixture produces a reading of greater than 7 on a Hegman gauge.

In one example of preparation, Nickel particles are obtained and Polymer P15-7SP4 from MasterBond of Hackensack, N.J. is obtained and used without further preparation. In one example, the Nickel particles are obtained from a vendor, such as Sigma-Aldrich of St. Louis, Mo.

To a clean container, 0.5 g of Nickel and 3.5 g of the P15-7SP4 polymer are combined into a mixture. The charged container was then subjected to centrifugal milling in a tool such as Speed mixer for increments of 30 seconds until the resulting mixture was homogenous, such as when the mixture produces a reading of greater than 7 on a Hegman gauge.

In one example of preparing an anisotropic conductivity coating, particles are pre-dispersed in a compatible solvent via sonication, milling, speed mixing, or micro-fluidization. In some examples, non-impact dispersion methods are used to reduce additional steps to remove milling media. In some examples, a typical procedure includes charging a container with isopropanol with 15-50% particles by weight. After this dispersion, the liquid/slurry is then incorporated into a polymer matrix. The resulting mixture is then subject to rotary evaporation to remove the isopropanol.

In some examples, further preparation of the anisotropic conductivity solution includes evacuating the mixture to remove any air that is incorporated during processing. In some examples, the prepared mixture is subjected to vacuum (<0.05 mBar) until completely out-gassed. The resulting mixture is then ready for deposition as a film.

Using the out-gassed, prepared solution, in some examples a film is prepared on any substrate directly. In some examples, releasing substrates are used to produce free films on glass or glass-coated substrate. In some examples, prior to receiving a film, a substrate is prepared with a releasing agent such as silicone grease.

With this in mind, in some examples the anisotropic conductive film is prepared onto a substrate and then transferred onto a charge-responsive layer of an e-paper structure. In some example, the anisotropic conductive film is deposited directly onto a charge-responsive layer (e.g. an electrically passive, imageable layer) of an e-paper structure.

In some examples, an anisotropic conductivity film is deposited onto a substrate via one of several different deposition methods. In some examples, such deposition methods include, but are not limited to, drawn-down coating, spin-coating, guided spreading, or roll coating. Once the desired thickness is achieved, the film is carefully brought to a magnetic field with the appropriate field alignment to cause alignment of the magnetically-responsive particles to form the previously-described elongate patterns, which serve as conductive pathways.

Once the desired "elongate conductive path" configuration is established, this configuration (while still being subject to the magnetic field) is then further subjected to curing with the appropriate energy wavelengths (i.e. infrared (IR), e-beam, or ultra-violet (UV)) to solidify the matrix with the elongate conductive path arrangement.

In some examples, the width or diameter of the elongate conductive paths (e.g. 56 in FIG. 1B, 185 in FIG. 3A, 441 in FIG. 6 etc.) and/or spacing between such elongate conductive paths is controllable via varying the viscosity of the insulative matrix (e.g. 33 in FIG. 1B, 3A or 433 in FIG. 6), the materials used, and/or the size of the conductive particles (e.g. 58 in FIG. 1B, 188 in FIG. 3A, etc.).

In some examples, instead of the above-described examples of providing magnetically-responsive conductive particles and aligning them with a magnetic field, the conductive particles are provided with a dielectric constant that differs greatly from a dielectric constant of the insulative matrix and an electric field is used to align the conductive particles into elongate patterns to provide elongate conductive paths similar to those previously described in association with at least FIGS. 1A-8. In some examples, an electric field is applied to a system including a dielectric matrix (polymer in uncured state) and conducting particles, in which the conducting particles would tend to arrange in vertical paths to reduce local fields.

At least some examples of the present disclosure provide for a protective coating for an electrically passive, e-paper structure with the protective coating providing preferential conductive paths to facilitate passage of air-borne charges to the imageable layer of the e-paper structure.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A charge-receiving layer for an electronic paper assembly, the charge-receiving layer comprising:
    an insulative matrix including a first side and an opposite second side; and
    a plurality of conductive paths spaced apart throughout the insulative matrix with a longitudinal axis of each path oriented generally perpendicular to a plane through which the charge receiving layer extends, wherein each conductive path includes at least one elongate pattern of field-aligned, conductive particles with the elongate pattern sized and shaped to receive deposited air-borne charges at the first side of the insulative matrix for passage to a charge-responsive layer at the second side of the insulative matrix.

2. The charge-receiving layer of claim 1, wherein each conductive path has a first conductivity in a first orientation between the first side and second side of the insulative matrix and wherein the insulative matrix has a second conductivity in at least a second orientation generally perpendicular to the first orientation, wherein the first conductivity is at least two orders of magnitude greater than the second conductivity.

3. The charge-receiving layer of claim 1, wherein the charge-receiving layer forms a non-adhesive, outer surface of the electronic paper assembly.

4. The charge receiving layer of claim 1, wherein at least a portion of the elongate patterns include conductive particles that are spaced apart from each other in generally perpendicular to the longitudinal axis of the respective conductive paths.

5. The charge receiving layer of claim 1, wherein the conductive paths together provide a combined conductivity, and wherein a second conductivity of the insulative matrix is at least one order of magnitude lower than the combined conductivity, and
    wherein a first ratio of the combined conductivity relative to the second conductivity is proportional to a second ratio of a thickness of the charge-receiving layer relative to a maximum allowable lateral travel of a charge in the insulative matrix.

6. The charge receiving layer of claim 1, wherein the at least one elongate pattern comprises at least two elongate patterns which are arranged in an end-to-end relationship to form at least some of the respective conductive paths.

7. An electronic paper assembly comprising:
    a charge-responsive media layer including a first side and an opposite second side;
    a counter electrode layer disposed on the second side of the media layer; and
    a charge-receiving layer disposed on the first side of the media layer and including plurality of conductive paths extending generally parallel to each other in a first orientation and spaced apart from each other within an insulative matrix, each conductive path extending in the first orientation between a first side and an opposite second side of the insulative matrix with the second side of the insulative matrix in contact with the first side of the media layer, and wherein each conductive path includes an elongate pattern of field-aligned, separate conductive particles, wherein elongate patterns are sized and shaped at the first side of the insulative matrix to receive a directed stream of air-borne charges, and
    wherein the charge-responsive media layer defines an imaging plane extending in a second orientation generally perpendicular to the first orientation.

8. The electronic paper assembly of claim 7, wherein the conductive particles include a magnetically-responsive material.

9. The electronic paper assembly of claim 7, wherein at least some of the conductive paths are formed by a series of separate segments spaced apart from each other in at least the first orientation, with each segment generally aligned in the first orientation, and each respective segment formed by one of the elongate pattern of conductive particles.

10. The electronic paper assembly of claim 9, wherein each segment has a pair of opposite ends, and the end of one segment is displaced laterally in the second orientation relative to the end of an adjacent segment within one of the respective series of segments.

11. The electronic paper assembly of claim 9, wherein at least some of the series of segments has a height shorter than a thickness of the insulative matrix.

12. The electronic paper assembly of claim 7, wherein the charge-receiving layer has a thickness that is a multiple of a thickness of the charge-responsive media layer.

13. The electronic paper assembly of claim 7, comprising:
    a protective layer disposed on the first side of the insulative matrix of the charge-receiving layer and being made of a material different from the insulative matrix, wherein the protective layer omits the conductive paths of the charge-receiving layer.

14. The electronic paper assembly of claim 13, wherein the protective layer has a degree of conductivity greater than a conductivity of the insulative matrix of the charge-receiving layer.

15. A method of manufacturing an electronic paper (e-paper) assembly comprising:
    providing an electrically passive, imageable layer having a first side and an opposite second side;
    arranging a counter-electrode layer on the second side of the imageable layer; and
    arranging a charge-receiving layer on the first side of the imageable layer, the charge-receiving layer including a plurality of elongate conductive paths dispersed throughout a conductive-resistant medium with each conductive path comprising an elongate pattern of field-aligned, conductive particles, wherein the conductive pathways are oriented to convey received charges through the conductivity-resistant medium generally perpendicular to, and onto, an imaging plane of the imageable layer.

16. The method of claim 15, comprising:
    arranging the conductive paths to collectively provide a first conductivity, and providing the conductive-resistant medium with a second conductivity that is at least one order of magnitude less than the first conductivity.

17. The method of claim 16, comprising:
arranging each elongate pattern of conductive particles to have a third conductivity that is about at least two orders of magnitude higher than the second conductivity.

18. The method of claim 16, comprising:
arranging a first ratio of the first conductivity relative to the second conductivity to be proportional to a second ratio of a thickness of the charge-receiving layer relative to a maximum allowable lateral travel of a charge in the conductive-resistant medium.

19. The method of claim 15, comprising:
arranging at least some conductive paths to include a series of spaced apart segments and arranging at least some of the series of segments to have a height less than a height of the charge-receiving layer.

* * * * *

UNITED STATES PATENT AND TRADEMARK OFFICE
CERTIFICATE OF CORRECTION

PATENT NO. : 10,310,353 B2
APPLICATION NO. : 15/306709
DATED : June 4, 2019
INVENTOR(S) : Doris Chun et al.

It is certified that error appears in the above-identified patent and that said Letters Patent is hereby corrected as shown below:

On the Title Page

Item [71], Line 2, delete "Fort Collins, CO" and insert -- Houston, TX --, therefor.

Page 2, Column 2, item [56], Foreign Patent Documents, Line 3, delete "102012005133" and insert -- 1020120051338 --, therefor.

Page 2, Column 2, item [56], Foreign Patent Documents, Line 4, delete "102013000653" and insert -- 1020130006536 --, therefor.

Signed and Sealed this
First Day of October, 2019

Andrei Iancu
*Director of the United States Patent and Trademark Office*